INVENTOR.
A. H. ASHLEY
BY F. J. Sullivan
ATTORNEY

INVENTOR.
A. H. ASHLEY
BY F. L. Sullivan
ATTORNEY

INVENTOR.
A. H. ASHLEY

BY F. L. Sullivan

ATTORNEY

United States Patent Office 3,249,926
Patented May 3, 1966

3,249,926
TESTING OF MAGNETIC MEMORY PLANES

Albert H. Ashley, Holliston, Mass., assignor to Sylvania Electric Products Inc., a corporation of Delaware Filed Apr. 2, 1962, Ser. No. 184,309
3 Claims. (Cl. 340—174)

This invention is concerned with electronic data processing systems and particularly with the testing of magnetic memory planes useful in such systems.

Magnetic core memory arrays are well known in the electronic data processing art. Their utility, construction and operation are discussed in detail in copending U.S. patent application Serial No. 679,967, now Pat. No. 3,058,096 also assigned to Sylvania Electric Products Inc., and this application and the references cited therein may be consulted for pertinent background and descriptive material.

Briefly, a typical magnetic core memory array is comprised of one or more memory planes. Each plane includes a number of toroid-shaped ferrite cores each having a bistable hysteresis characteristic in that it is capable of being switched between first and second stable conditions of remanent magnetic flux by driving a current of a critical magnitude through a conductor passing through the center opening of the toroid. In order to enable any desired core in the plane to be selectively addressed by a switching current, the cores are arranged in horizontal rows and vertical columns defined by the $x$- and $y$-coordinate conductors of a matrix arrangement. Then, when the row and the column conductors which determine the location of the desired core are each pulsed with current of one-half the critical magnitude, this particular core is switched from one stable condition of remanent magnetic flux to another. The remainder of the cores along the row and the column concerned experience flux disturbance but are not switched to the opposite end of the hysteresis loop with the selected core, which has experienced the coincidence of both the row and column current pulses, because these unselected cores have been exposed to current of only half the critical magnitude.

Thus, the ONE of a binary signal notation may be written into any desired core by applying half-write current pulses to its $x$- and its $y$-coordinate conductors so that it will assume a first state of remanent flux; and all of the other cores along these conductors will experience what is termed a write disturbed ZERO or write disturbed ONE flux disturbance when the half-write pulses are applied but they will not switch from the ZERO to the ONE position on the hysteresis loop of their particular cores. Similarly, when a core in the ONE condition is addressed by the coincidence of half-read pulses along its $x$ and $y$ conductors, it will experience a flux reversal from ONE to ZERO position on its hysteresis curve but the other cores along its coordinate conductors will experience merely a read disturbed ONE or a read disturbed ZERO flux disturbance.

A sense winding conductor is threaded through all of the cores of the array, and a relatively large signal pulse induced into this conductor as a result of complete flux reversal indicates that a binary ONE was stored in the particular core addressed by the coincidence of read pulses, whereas a relatively small signal pulse in this winding indicates that there was no flux reversal as a result of the reading operation and consequently the core concerned was in binary ZERO condition.

It will be appreciated that the reliability of the operation of this type of memory depends upon the extent to which the amplitude of signal induced into the sense winding by the flux reversal of a binary ONE may be distinguished from the cumulation of disturbances along the $x$ and $y$ conductors of an addressed core which is storing a binary ZERO. A common technique for abetting this distinction is to wind the sense conductor in such a manner through the various cores of the array that it intersects half of the cores of each row and half of the cores in each column from a different direction (see FIG. 1) so that there will be a mutual cancellation of these disturbance signals induced into the winding from any row or column of cores. Even when this precaution is taken, however, if all of the cores in the array don't have substantially uniform flux reversal characteristics and as a result some of the cores along a given conductor provide as much response to a half-read pulse as others do to a full read pulse, it becomes impossible to distinguish the signal resulting from the flux reversal due to reading a ONE from that due to merely disturbing the ONES and ZEROS along the conductors to the addressed core. Consequently, manufacturers and users must be able to test the performance of magnetic core memory arrays if they are to have complete confidence in the reliability of their operation. Hitherto, this has been accomplished by elaborate "worst possible condition" testing, involving complicated programming of signals processed through a computer to the memory, and expensive test equipment.

Accordingly, a principal object of the present invention is to provide an improved means for testing magnetic memory systems. Another object is to provide a less expensive and less complicated technique for testing magnetic core memory planes.

These and other related objects are accomplished in one embodiment of the invention which features the use of the sense winding as a signal input to the memory plane during the testing procedure, as contrasted from its conventional function as a signal output device, to create a "worst possible condition" as a preliminary to read-out from the memory plane. This test procedure is initiated by applying a full drive current signal to the sense winding. If this winding has been threaded through half of the cores of each row and column in one direction and the other half of the cores in the opposite direction, in the manner referred to above for noise cancellation purposes, the result is that one half of the cores along each conductor will be set in the ONE condition and the other half of the cores will be set in the ZERO condition. Consequently, in a manner which will be described in more detail below, a maximum disturbance signal will be induced into the sense winding during the read-out process. This signal may then be compared against acceptable reference standards, may be referenced for setting the threshold of output sense amplifiers, compared for uniformity with respect to all of the rows or columns of cores within a single plane or all of the planes within an array, or utilized for other testing purposes.

Other objects, embodiments, features, and modifications of the invention will be apparent from the following description of method and apparatus for testing magnetic core memory planes, wherein.

Figure 1:
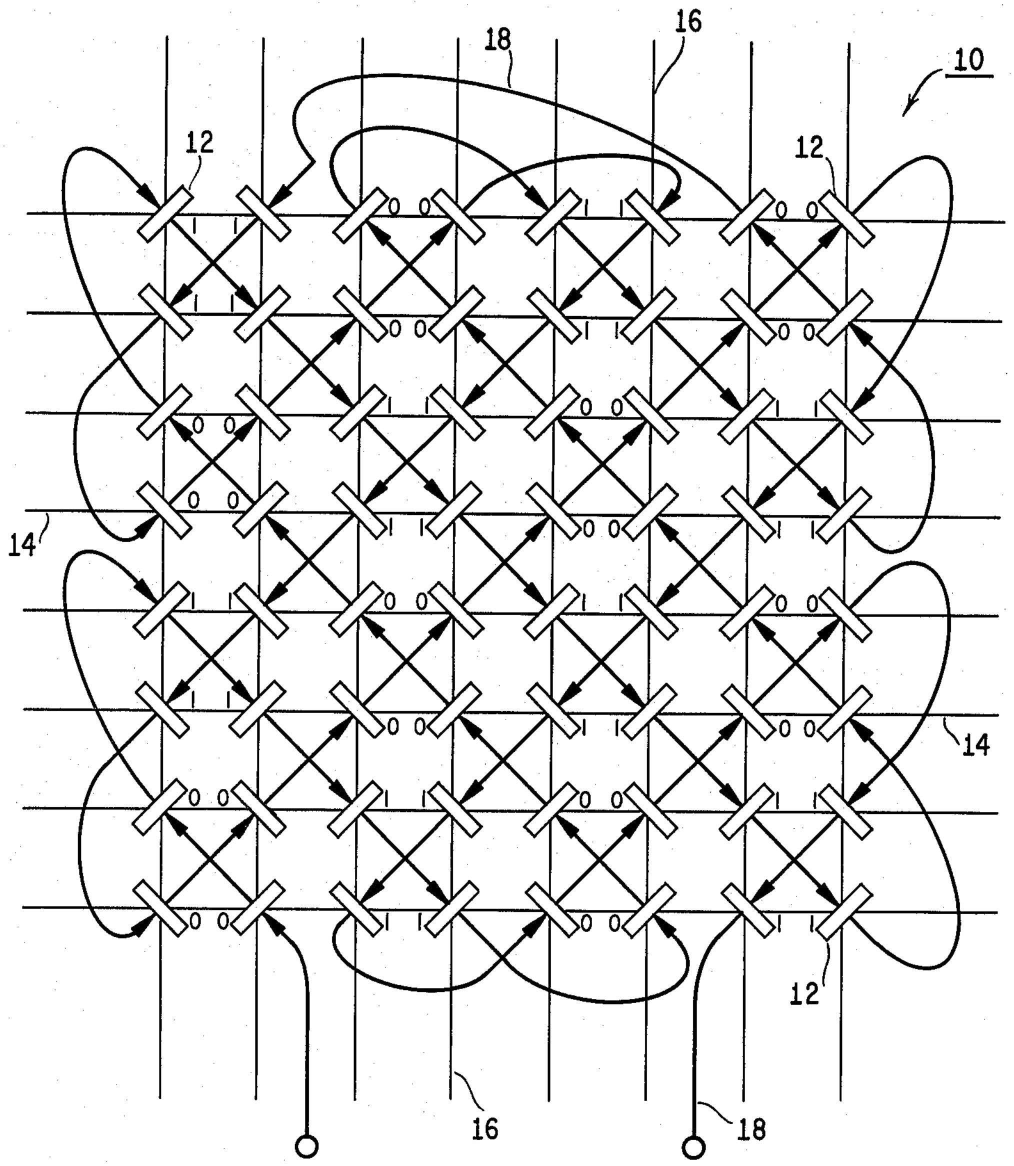
FIG. 1 is a diagrammatic representation of a magnetic core memory plane.

The memory plane 10 of FIG. 1 is comprised of a plurality of magnetic cores 12 arranged in horizontal rows and vertical columns. Each core is linked by a separate $x$-coordinate conductor 14, corresponding to the rows of the resulting matrix, and by a $y$-coordinate conductor 16 corresponding to its vertical columns. A single sense winding 18 links all of the cores of the matrix.

Figures 2A, 2B:
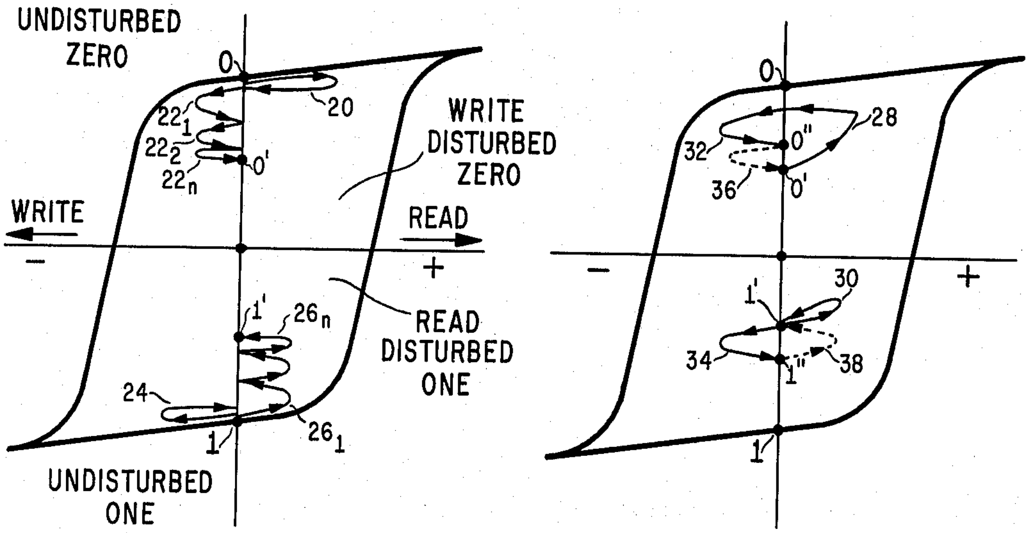
FIGS. 2A and 2B are diagrammatic representations of the hysteresis loop of a bistable ferrite core in various signal conditions with flux excursion loops exaggerated for demonstration purposes.

In the operation of this memory plane, a half-write current pulse applied simultaneously to any horizontal conductor 14 and a vertical conductor 16 will cause the core located at the intersection of these conductors to switch from the "0" position shown on the hysteresis curves of FIGS. 2A and 2B or the "0′" position to the "1" position. Similarly, the coincidence of a half-read current pulse along with the row and column conductors of any given core will switch it from the 1 or 1′ position to the 0 position on its hysteresis axis.

The effect of half-read and half-write current pulses is shown in the minor switching loops indicated on the hysteresis plots in FIGS. 2A and 2B. A core in the undisturbed ZERO condition 0 of FIG. 2A, if it is exposed to a read current pulse in the positive direction will experience a flux excursion of the sort indicated by the minor loop 20 but will return to the 0 position on the vertical hysteresis axis as soon as the positive current pulse is removed. This will take place whether the core is exposed to a full or only a half-read pulse. If, on the other hand, the core is exposed to a half-write current pulse in the negative direction, it will follow the path of the minor loop $\mathbf{22}_1$ and assume a lower position on the hysteresis axis when the current pulse has been removed. Successive half-write current pulses will produce similar loops $\mathbf{22}_2$–$\mathbf{22}_n$ of gradually diminishing flux reversal effect until the core assumes the write disturbed ZERO position 0′ from which it will move up the axis towards the undisturbed ZERO position 0 if it is exposed to a positive read pulse but will not move any significant distance down the axis below the disturbed ZERO position in response to additional half-write current pulses. Of course, a full write current pulse will move the hysteresis condition of the core all the way to the bottom of the loop to the 1 position from any point along the vertical hysteresis axis.

Similarly, a core in the undisturbed ONE condition 1 will pass through the minor loop 24 and return to the 1 position on the hysteresis axis if it is exposed to negative write current pulses and will proceed up the axis in minor loops $\mathbf{26}_1$–$\mathbf{26}_n$ in response to half-read positive current pulses until its response stabilizes at the 1′ position indicated on the axis. A detailed explanation and mathematical analysis of these major and minor switching loops of bistable magnetic cores is presented in an article entitled "Pulse Responses of Ferrite Memory Cores" published by J. R. Freeman in the IRE Wescon Convention Record for 1954.

It will be appreciated that a sense winding linking the core and having an output pulse induced into it whenever the core experieces a change in its condition of remanent magnetic flux will provide relatively large signals when a core switches from a ZERO position to a ONE position and vice versa, and a relatively minor signal output when it moves in a minor loop between the 0′ and the 0 position or the 1′ and the 1 locations on the axis. The general phenomenon with which we are concerned is the possibility that when a core being addressed by the coincidence of two half-read current pulses to inquire as to whether it is storing a ONE or a ZERO, is in ZERO condition the cumulative effect of the half-read current pulses on the other cores along its $x$- and $y$-coordinate axes will produce a signal of such amplitude that it will be interpreted as a ONE read-out from the core addressed whereas in fact this core was in the ZERO condition.

As has been explained in the introductory passages above, it is conventional practice to weave the sense winding 18 through the cores in such a manner that it will intercept half the cores of each row (or column) in one direction and the remaining half in the opposite direction so that half the signals induced into it will be of one polarity and half of the opposite polarity. Theoretically, these induced signals should on a statistical average cancel each other out and the net signal result in the sense winding should be relatively large if the addressed core experiences major flux reversal switching and of relatively low amplitude if the core experiences merely minor loop switching. The small arrows at the point where the sense winding intercepts the various cores 12 in the memory plane of FIG. 1 shows the relative direction of the interception and consequently provides an indication of the polarity of signal induced from each of the cores concerned. A count along any of the rows 14 or columns 16 will demonstrate that in the pattern followed for this particular diagram half of the cores in each row and each column are intercepted by the sense winding 18 in one direction and half in the opposite direction to accomplish the purpose which has just been discussed.

Thus, proper weaving of the sense conductor 18 through the memory plane 10 will cancel out those disturbances which follow a random pattern of statistical averages. Difficulties will be encountered, however, if the signal processing experience of the matrix is such that it does not contain a random distribution of disturbed and undisturbed ONES and ZEROS and they are not substantially equal in number along each row and column or if the hysteresis characteristics of all of the cores employed in the matrix are not so substantially identical that they provide equal signal response to equal input or disturbance effects.

The worst possible case for canceling out disturbance signals is the checkerboard pattern diagrammed as the condition of the cores in the memory array of FIG. 1. In the pattern of data content shown here it may be noted that every core containing a ONE is threaded by the sense winding in the same direction, i.e. from top to bottom. Every core containing a ZERO, on the other hand, is also threaded in the same direction but opposite to the cores containing the ONES, i.e. from bottom to top. As a consequence, if we assume that the memory plane is in its maximum disturbed condition, i.e. with all of the cores containing a ONE in the 1′ position on the hysteresis axis of FIG. 2A and all of the cores containing a ZERO are in the 0′ position on the axis, there will be a minimum signal contribution from the ONE cores and a maximum contribution from the ZERO cores when any combination of $x$- and $y$-coordinate conductors are both driven by a half-read current pulse. This means that the ZERO cores will contribute a maximum disturbance signal to the sense conductor 18 and the ONE cores will not make any significant canceling contribution in the opposite direction. FIG. 2B shows a diagrammatic representation of the flux disturbance and, consequently, the signal result of a write disturbed ZERO making the minor loop excursion 28 in response to a half-read pulse as compared with the relatively smaller loop 30 experienced by the read disturbed ONE core in response to the same half-read pulse.

It is apparent that the ability to put the memory plane into the checkerboard condition of FIG. 1 is a very useful step as a preliminary to testing the output of the plane under reliable reference conditions. As has been explained in the introductory discussion above, a primary concern of the present invention is to accomplish this purpose without elaborate computer programming and expensive test equipment.

In practicing the embodiment of the invention under discussion, the checkerboard pattern of FIG. 1 is achieved by applying to the sense winding 18 a full write current pulse followed by a series of half-read pulses. We may assume that the full write pulse will switch into an undisturbed ONE condition, i.e. position 1 as shown on the hysteresis curve of FIG. 2A, every core which the sense winding 18 intercepts in the direction from top to bottom as shown in FIG. 1. At the same time, this pulse will switch to the undisturbed ZERO condition, i.e. position 0 on the hysteresis curve of FIG. 2A, every core intercepted in the opposite direction, i.e. from bottom to top as shown in FIG. 1. After the full write pulse has brought the cores into this initial condition, the series of half-read pulses of opposite polarity will move the ZERO cores from the position 0 down the axis to the position 0′ (since, due to the direction of its interception of the cores concerned, the read pulse in the sense winding has the effect of a negative half-write pulse), and the ONE cores will be moved from the position 1 to the position 1′ on the axis. Thus, the checkerboard pattern is set up; and, then, if any combination of row conductors 14 and column conductors 16 are both pulsed with a half-read current drive all of the ZERO cores will experience the flux disturbance 28 in FIG. 2B and all of the ONE cores will experience the relatively minor disturbance 30. Moreover, they can be returned to the previous disturbed checkerboard condition by the application of a half-write current pulse to these same conductors causing the ZERO cores to go through loop 32 to arrive at the position 0″ and the ONE cores to go through loop 34 to arrive at the point 1″ on the hysteresis axis of FIG. 2B, followed by a reset series of half-read pulses applied to the sense winding 18 in order to return both the ZERO and ONE cores to their maximum disturbed positions, 0′ and 1′, respectively, by traversing dotted line loops 36 and 38.

Figure 3:
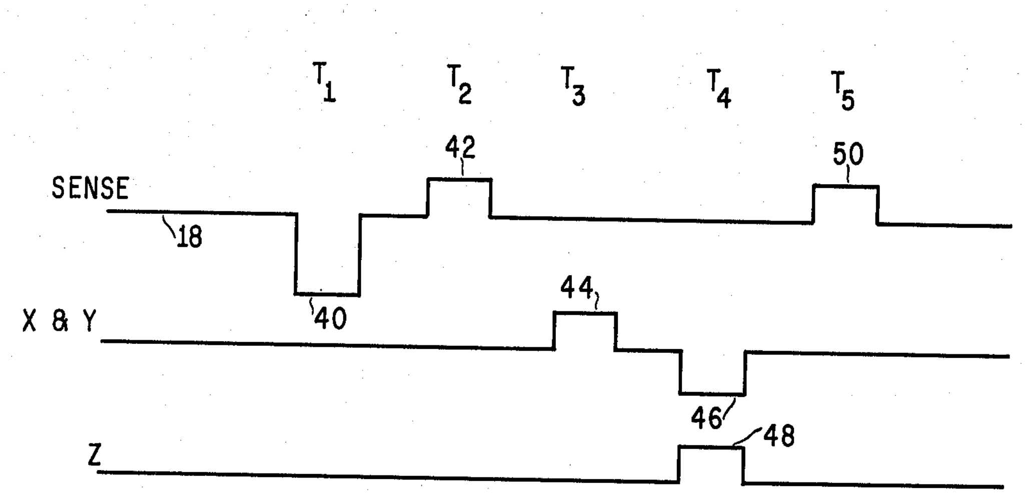
FIG. 3 is a diagrammatic representation of current pulses applied to the memory of FIG. 1 in practicing the invention; and, FIG. 4 is a diagram of a memory plane under test in accordance with the principles of the invention.

A sequence of pulses for implementing this test procedure is diagrammed in FIG. 3. We may assume that a negative pulse 40 of core switching amplitude is first applied to the sense winding 18 at time $T_1$. This sets all of the cores in the checkerboard pattern of ONES and ZEROS shown in FIG. 1. A positive pulse 42 of half switching amplitude is then applied to the sense winding 18 at time $T_2$ to move the cores from their undisurbed to their disturbed 1′ and 0′ conditions as shown on the hysteresis axes of FIGS. 2A and 2B. Then, at time $T_3$ a half-read pulse 44 is applied to each one of a pair of *x*- and *y*-coordinate conductors. This will produce a maximum noise disturbance signal from all of the ZERO cores linked by the *x*- and *y*-coordinate conductors which have been pulsed and will switch the core at the intersection of the two coordinates selected to the undisturbed ZERO condition at point 0 on the axis of the curve in FIGS. 2A and 2B. As explained above, those cores along the pulsed coordinate conductors which are in ONE condition, except for the single core at the intersection, will produce a minimum signal output.

At time $T_4$ a half-write negative current pulse 46 is applied to the *x* and *y* conductors selected at time $T_3$ and the cores linked by these conductors traverse the loops 32 and 34 to positions 0″ or 1″, depending upon whether they were in the ZERO or ONE condition at the time the read pulses were applied. A half-read inhibit pulse 48 may be applied to the Z winding at this time, in a conventional manner, if it is desired to leave the "read" core in ZERO condition for the next read cycle. On the other hand, the inhibit pulse may be omitted, in conventional manner, if it is desired to rewrite a ONE into the core at the intersection of the pulsed coordinates. At time $T_5$ a half-read positive current pulse 50 is applied to the sense winding so that the checkerboard cores in ZERO condition will be moved from the 0″ to the 0′ position on the hysteresis axis and the cores in ONE condition will be moved from the 1″ to the 1′ position.

Figure 4:
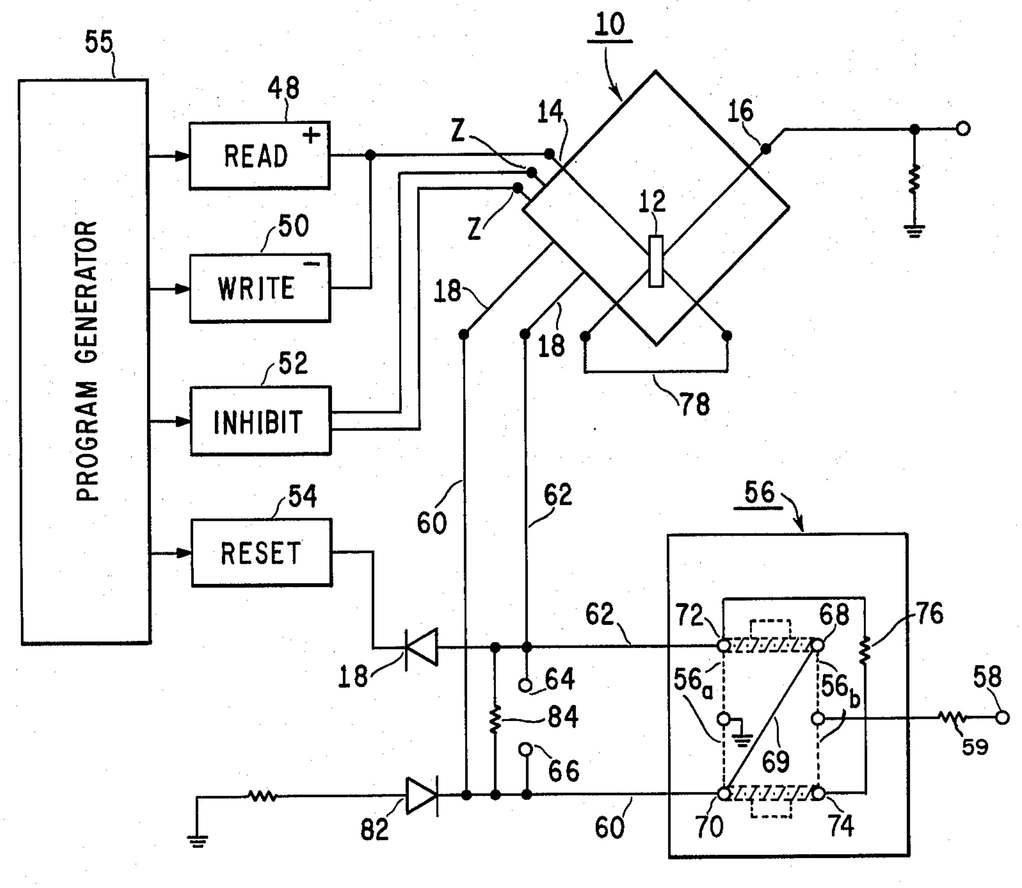

Apparatus for performing this test procedure is shown diagrammatically in FIG. 4. Here, the memory plane 10 of FIG. 1 is shown connected to a read pulse generator 48, a write pulse generator 50, an inhibit pulse generator 52, and a reset pulse generator 54. The operation of these generators is controlled by signals from a program generator 55. A manually operated switch 56 is also shown connecting a terminal 58, to which a suitable current source is connected, through a full amplitude pulse (i.e. a full write pulse 40) conducting path 60 or an opposite polarity half-pulse (i.e. half-read pulse 42) conducting path 62 to the sense winding 18 of the memory plane 10. Terminals 64 and 66 are provided across these leads 60 and 62 in order to provide a means for connecting an oscilloscope, amplifier or other test equipment to the sense output conductor 18 from the memory apparatus under test.

In the operation of this test equipment, the initial full write switching pulse 40 of FIG. 3 is provided to the sense conductor 18 by closing the double pole, double throw, switch 56 in the upper dotted line position shown so that current flows from terminal 58 through current limiting resistor 59 and side 56*a* of switch 56 to terminal 68 and thence via connector 69 and terminal 70 to conductor 60 and one side of the sense winding 18. The return for this potential is from the other side of sense winding 18, via conductor 62 to terminal 72 and through arm 56*b* of the switch 56 to ground. In the next step of the operation, one or more half-read pulses 42 may be applied to the sense winding 18 by closing the switch 56 to the lower dotted line position. Now, current flows from terminal 58 through resistor 59, and the right arm 56*a* of switch 56 to terminal 74 and thence through a resistor 76 which reduces the current to half core-switching potential, to conductor 62 and one side of sense winding 18. The return path for this potential is from the other side of the sense conductor 18, via conductor 60 to terminal 70 and, thence, through the left arm 56*b* of switch 56 to ground. Alternatively, this current pulse 42 could be derived from the reset pulse generator 54 if automatic operation is desired.

The read current pulse 44 and the write current pulse 46 are derived from corresponding pulse generators 48 and 50, respectively. Although the regular pulse generators of a memory system could be simulated or utilized for this purpose, the particular apparatus shown does not provide separate pulses for the row and the column conductors but instead provides a single pulse of half core-switching amplitude and interconnects the row and column conductors desired to each other by means of a clip lead or other suitable connection 78. This results in the same half-switching amplitude current pulse being conducted through a given row and a given column of cores once and through the selected core 12 at the intersection of this row and column twice, once as the current flows along the row conductor, and a second time as it flows along the column conductor connected to the row by lead 78. Inhibit pulse generator 52 provides the half-switching amplitude positive pulse 48 to the Z winding of a memory plane 10 in a manner which is a straightforward simulation of the inhibit pulsing of a conventional memory, and the reset pulse generator 54 provides the positive half-switching pulses 50 to the sense winding 18 at time $T_5$ in the manner already described above with reference to the hand operated switch 56. Diode 80 isolates the reset pulse driver 54 from the circuit connection to the sense winding during operation of the manual switch 56 and diode 82 provides a signal path to ground from the sense winding 18 when the circuit is operating automatically and the switch 56 is in the "OFF" position, i.e. intermediate the two dotted line positions shown. Terminating resistor 84 is relatively large, approximately ten times the value of the normal resistance of the sense winding, to provide suitable input for an oscilloscope or other test equipment across terminals 64 and 66.

It will be readily appreciated that, in addition to providing for repetitive sequences of read, write, inhibit, and reset pulses to observe circuit performance on an oscilloscope connected between terminals 64 and 66, the program generator 55 can be extended in its control functions so that it can connect the read and write pulse generators 48 and 50 to any desired sequence of rows and columns or produce the proper pattern of inhibit pulses from pulse generator 52 so that a desired sequence of ONE and ZERO signals may be observed.

Although only one specific test procedure has been described and only one combination of apparatus has been shown, it is apparent that the invention is applicable to other procedures and useful with other types of memory elements such as apertured plates, thin magnetic films, twisters, etc. Consequently, it is not limited to the specifics of this description, but embraces the full scope of the following claims.

What is claimed is:

1. Apparatus for testing the noise disturbance in a magnetic core memory array including a plurality of magnetic cores capable of being switched between first and second stable conditions of remanent magnetic flux arranged in X coordinate rows and Y coordinate columns, corresponding X and Y coordinate conductors linking corresponding rows and columns of cores, and a sense winding linking all of said cores so as to intercept the electromagnetic field of substantially half the cores of every row and column in one effective direction and half in the opposite direction, said apparatus comprising: means for applying to said sense conductor a first pulse to switch half of said cores in every row and column to one stable flux condition and the other half of said cores in every row and column to the other stable flux condition, means for applying to said sense conductor a second pulse to read disturb half of said cores in every row and column and write disturb the other half of said cores in every row and column, means for applying to selected coordinate conductors respective third pulses to switch the core linked by said selected conductors and further disturb the flux condition of the remaining cores linked by each selected coordinate conductor, and means for detecting the noise signal induced in said sense winding by said switched core and the further disturbed cores.

2. Apparatus for testing the noise disturbance in a magnetic core memory array including a plurality of magnetic cores capable of being switched between first and second stable conditions of remanent magnetic flux arranged in X coordinate rows and Y coordinate columns, corresponding X and Y coordinate conductors linking corresponding rows and columns of cores, and a sense winding linking all of said cores so as to intercept the electromagnetic field of substantially half the cores of every row and column in one effective direction and half in the opposite direction, said apparatus comprising: means for applying to said sense conductor a full write pulse to switch alternate ones of said cores in every row and column to one stable flux condition and the other alternate ones of said cores in every row and column to the other stable flux conditions, means for applying to said sense conductor a first half read pulse to read disturb and write disturb respective alternate ones of said cores in every row and column, means for applying to selected X and Y coordinate conductors a second half read pulse to switch the core linked by said selected X and Y conductors and further disturb the flux condition of the remaining cores linked by each selected X and Y conductor, and means for detecting the noise signal induced in said sense winding by said switched core and the further disturbed cores.

3. Apparatus for testing the noise disturbance in a magnetic core memory array including a plurality of magnetic cores capable of being switched between first and second stable conditions of remanent magnetic flux arranged in X coordinate rows and Y coordinate columns, corresponding X and Y coordinate conductors linking corresponding rows and columns of cores, and a sense winding linking all of said cores so as to intercept the electromagnetic field of substantially half the cores of every row and column in one effective direction and half in the opposite direction, said apparatus comprising: means for applying to said sense conductor a first current pulse of sufficient amplitude and proper polarity to switch the cores linked by said sense conductor from one stable flux condition to another and thereby establish half the cores in each row and column in a ZERO state and the other half of the cores in each row and column in a ONE state, means for applying to said sense conductor a second current pulse of opposite polarity and substantially half the amplitude of said first pulse to write disturb the cores in the ZERO state and to read disturb the cores in the ONE state thereby to maximally disturb the stable flux condition of said cores, means for applying to selected X and Y coordinate conductors a third and a fourth current pulse respectively of the same polarity as said second pulse and of sufficient amplitude to switch the core linked by said selected X and Y coordinate conductors and to produce a maximum noise disturbance signal from all of the ZERO cores linked by said selected X and Y conductors and a minimum noise disturbance signal from all of the ONE cores except said switched core linked by said selected X and Y conductors, and means for detecting a maximum noise disturbed output signal induced in said sense winding by the cores linked by said selected X and Y conductors.

References Cited by the Examiner

UNITED STATES PATENTS

| | | | |
|---|---|---|---|
| 2,880,406 | 3/1959 | Bindon et al. | 340—174 |
| 2,964,737 | 12/1960 | Christopherson | 340—174 |

OTHER REFERENCES

Page 45, June 1960, Publication I, IBM Technical Disclosure Bulletin, vol. 3, No. 1.

Pages 21 and 22, 324–34, August 1958, Publication II, IBM Technical Disclosure Bulletin, vol. 1, No. 2.

IRVING L. SRAGOW, *Primary Examiner.*

WALTER W. BURNS, Jr., *Examiner.*

R. R. HUBBARD, M. S. GITTES, *Assistant Examiners.*